United States Patent
Wu et al.

(10) Patent No.: US 11,008,859 B2
(45) Date of Patent: May 18, 2021

(54) METHOD FOR ANALYZING COALBED METHANE GEOLOGICAL SELECTION OF MULTI-COALBED HIGH GROUND STRESS REGION

(71) Applicant: China University of Mining and Technology, Jiangsu (CN)

(72) Inventors: Caifang Wu, Jiangsu (CN); Xiaolei Liu, Jiangsu (CN); Shunxi Liu, Jiangsu (CN); Mingyang Du, Jiangsu (CN); Shasha Zhang, Jiangsu (CN); Erchao Zhang, Jiangsu (CN)

(73) Assignee: China University of Mining and Technology, Jiangsu (CN)

(*) Notice: Subject to any disclaimer, the term of this patent is extended or adjusted under 35 U.S.C. 154(b) by 242 days.

(21) Appl. No.: 16/337,411

(22) PCT Filed: May 25, 2018

(86) PCT No.: PCT/CN2018/088401
§ 371 (c)(1),
(2) Date: Mar. 28, 2019

(87) PCT Pub. No.: WO2019/148704
PCT Pub. Date: Aug. 8, 2019

(65) Prior Publication Data
US 2020/0131902 A1    Apr. 30, 2020

(30) Foreign Application Priority Data
Jan. 30, 2018 (CN) .......................... 201810086245.9

(51) Int. Cl.
*E21B 49/00* (2006.01)
*E21B 47/06* (2012.01)
(Continued)

(52) U.S. Cl.
CPC .............. *E21B 49/00* (2013.01); *E21B 47/06* (2013.01); *G06Q 10/06315* (2013.01); *G06Q 50/02* (2013.01); *E21B 43/006* (2013.01)

(58) Field of Classification Search
None
See application file for complete search history.

(56) References Cited

U.S. PATENT DOCUMENTS 4,581,531 A    4/1986 Dion

FOREIGN PATENT DOCUMENTS

| CN | 103993862 | 8/2014 |
|---|---|---|
| CN | 104199121 | 12/2014 |

(Continued)

OTHER PUBLICATIONS

Song et al. (Syncline reservoir pooling as a general model for coalbed methane (CBM) accumulations: Mechanisms and case studies, Journal of Petroleum Science and Engineering, 2012, vols. 88-89, pp. 5-12). (Year: 2012).*

(Continued)

*Primary Examiner* — Roy Y Yi
(74) *Attorney, Agent, or Firm* — JCIPRNET

(57) ABSTRACT

The present invention discloses a method for analyzing coalbed methane geological selection of a multi-coalbed high ground stress region, including the following steps: defining the concepts of a favorable area, a sweet spot area, and a sweet spot section; carrying out the selection process on the favorable area, the sweet spot area and the sweet spot section in sequence; selecting different indicators for the characteristics of each stage, explicitly presenting key indicators and reference indicators at each stage, and providing an indicator with one-vote veto rights in the key indicators; and carrying out comprehensive analysis to obtain favorable planar areas and vertical intervals of coalbed methane explo- (Continued)

ration and development in the multi-coalbed high ground stress region. The method of the present invention provides instructions on coalbed methane geological selection of a multi-coalbed high ground stress region, and is of great significance for the development of coalbed methane.

9 Claims, 1 Drawing Sheet

(51) Int. Cl.
    *G06Q 10/06*     (2012.01)
    *G06Q 50/02*     (2012.01)
    *E21B 43/00*     (2006.01)

(56) References Cited

FOREIGN PATENT DOCUMENTS

| | | |
|---|---|---|
| CN | 105787805 | 7/2016 |
| CN | 105913329 | 8/2016 |
| RU | 2008119701 | 11/2009 |

OTHER PUBLICATIONS

Suping et al. ("Factors facilitating or limiting the use of AVO for coal-bed methane," 2006, GEOPHYSICS 71: C49-C56.) (Year: 2006).*

Wang et al., "Discussion on methods for selected areas evaluation of coalbed methane: A case study of southern Junggar Basin", Journal of China Coal Society, Apr. 2007, pp. 950-958.

Ning et al., "A Research on the Method of Geological Regional Selection Evaluation of Coalbed Gas", Natural Gas Industry, May 1999, pp. 34-35 and 4-5.

Gui Bao-Lin, "The Selected Area and Evaluation of Exploration Target of Seam Gas in East Yunnan and West Guizhou", Yunnan Geology, Oct. 2004, pp. 410-420.

Chen et al., "Geological Evaluation System of Potential Coalbed Methane Exploration and Development Blocks with Low and Medium Coal Ranks", Journal of Jilin University (Earth Science Edition), Nov. 2012, pp. 115-120.

Wang et al., "Criteria for the evaluation of coalbed methane area selection in China", Geological Bulletin of China, Oct. 2006, pp. 1104-1107.

"International Search Report (Form PCT/ISA/210)", dated Sep. 26, 2018, pp. 1-5.

* cited by examiner

METHOD FOR ANALYZING COALBED METHANE GEOLOGICAL SELECTION OF MULTI-COALBED HIGH GROUND STRESS REGION

CROSS-REFERENCE TO RELATED APPLICATION

This application is a 371 application of International PCT application serial no. PCT/CN2018/088401, filed on May 25, 2018, which claims the priority benefit of Chinese application no. 201810086245.9, filed on Jan. 30, 2018. The entirety of each of the abovementioned patent applications is hereby incorporated by reference herein and made a part of this specification.

BACKGROUND OF THE INVENTION

1. Technical Field

The present invention relates to the technical field of coalbed methane geological selection, and in particular, to a method for analyzing coalbed methane geological selection of a multi-coalbed high ground stress region.

2. Description of Related Art

At present, the large-scale development of coalbed methane in China is mainly concentrated in the Qinshui Basin and the eastern margin of the Ordos Basin. Starting from the "13th Five-Year Plan", the development area has gradually expanded to the regions such as the multi-coalbed regions in the Eastern Yunnan-Western Guizhou and the low-rank coal regions in the Junggar Basin, Xinjiang. As a reserve base for coalbed methane exploration and development in China, the Eastern Yunnan-Western Guizhou region has abundant coalbed methane resources, and the geological resource quantity of coalbed methane with a burial depth of 200-1500 m is up to $2.9 \times 10^{12}$ m$^3$, which has the resource conditions for large-scale development.

The geological selection is a prerequisite for the development of coalbed methane, and favorable areas for the development of coalbed methane need to be firstly optimized in order to achieve the large-scale overall development of coalbed methane. At this stage, the geological selection criteria in China are mainly for the two single-coalbed development basins in the Qinshui Basin and the eastern margin of the Ordos Basin. The focus is on the optimization of the plane enrichment and high permeability zone, and does not involve the problem of interlayer interference and vertical selection. Compared with the Eastern Yunnan-Western Guizhou region, the Qinshui Basin and the eastern margin of the Ordos Basin are relatively simple structurally, the coal structure is relatively intact, and the coalbed methane target layer is the primary mineable coalbed in the region, and the basic geological parameters are easy to obtain. In contrast, the geological conditions and coalbed occurrence conditions in the Eastern Yunnan-Western Guizhou region are quite different from those in the above two basins, mainly in a number of layers of coalbeds in the region, which is up to dozens of layers, small interlayer spacing, small coalbed single-layer thickness, high ground stress, high structural complexity, and broken coal structure; and there are several independent gas-bearing systems in the vertical direction, the development method is multilayer commingled development, and the combination of mismatched vertical intervals will cause serious interlayer interference, resulting in very low gas production. Therefore, when carrying out the coalbed methane geological selection in the multi-coalbed development area of the Eastern Yunnan-Western Guizhou region, both the planar favorable area and the combination of the vertical intervals need to be optimized. Most of the currently selected indicators are traditional planar selection indicators, lack of representativeness, and often overlook the vertical favorable interval evaluation indicators. There is an urgent need to form a systematic and highly targeted selection analysis method for the special geological conditions of the multi-coalbed high ground stress region in the Eastern Yunnan-Western Guizhou.

SUMMARY OF THE DISCLOSURE

For the deficiencies of the prior art, the present invention designs a method for analyzing coalbed methane geological selection of a multi-coalbed high ground stress region.

To achieve the foregoing objective, the present invention adopts the following solution: optimization is performed on three stages, a favorable area, a sweet spot area, and a sweet spot section in sequence and mainly includes the following steps:

defining an area that is beneficial to the development of coalbed methane as a favorable area, and optimizing in a plurality of coal-bearing synclines;

defining an area that is beneficial to achieve the high yield of coalbed methane as a sweet spot area, optimizing in one or more of the optimized favorable areas, and selecting in the interior of only one coal-bearing syncline; and defining a vertical combination interval that is beneficial to the development of coalbed methane as a sweet spot section, and performing vertical optimization in the range of the sweet spot area;

optimization of a favorable area, wherein the selected key indicators are coalbed methane geological resource quantity, coalbed methane geological resource abundance and coalbed methane recoverable resource quantity, and the reference indicator is recoverable resource quantity of less than 1 km;

optimization of a sweet spot area, wherein the selected key indicators are structural complexity, ground stress and burial depth, and the reference indicator is topography and geomorphology;

optimization of a sweet spot section, wherein the selected key indicators are coal structure, a critical desorption pressure difference and a reservoir pressure gradient difference, and the reference indicator is the mechanical property difference of a coalbed and a roof and floor thereof.

Further, the structural complexity is quantified by fault fractal dimension, and the ground stress is quantified by structural curvature.

Further, the coalbed methane geological resource quantity and the coalbed methane geological resource abundance in the optimization indicators of the favorable area have the one-vote veto rights, and the one-vote veto criteria are that the coalbed methane geological resource quantity is less than $30 \times 10^8$ m$^3$ and the coalbed methane geological resource abundance is less than 0.5 m$^3$/km$^2$; the structural complexity in the optimization indicators of the sweet spot area has the one-vote veto rights, the one-vote veto criterion for the structural complexity is a fault-intensive development area, and specific value is determined according to a correspondence of the fault distribution and a contour map of the fault fractal dimension; the coal structure in the optimization indicators of the sweet spot section has the one-vote veto right, and one-vote veto criterion for the coal structure is that the proportion of granulated coal and mylonitized coal is greater than 60%.

Further, in the process of optimization, the key indicators are considered first, and then the reference indicators are considered; a one-vote veto indicator in the key indicators is considered first, and then other key indicators are considered; in the optimization process of the sweet spot area, the priority of the key indicators is the structural complexity, the ground stress and the burial depth from high to low in sequence; and in the optimization process of the sweet spot section, the priority of the key indicators is: the coal structure, the critical desorption pressure difference and the reservoir pressure gradient difference from high to low in sequence.

Further, the critical desorption pressure difference in the optimization indicators of the sweet spot section is determined according to Formula (1):

$$\rho g \Delta h > \max|\Delta P_{cij}| \quad (1)$$

In the formula, $\rho$ is the density of a water column in a wellbore, g is a gravitational acceleration, $\Delta h$ is the height of a level in the wellbore from the uppermost coalbed of the combined interval, and $\Delta P_{cij}$ is a critical desorption pressure difference of any two coalbeds in a combined interval, wherein i and j take 1, 2, 3 . . . , and i≠j;

if the maximum critical desorption pressure difference between the coalbeds in the combined interval does not satisfy Formula (1), the coalbed with a small critical desorption pressure is removed, and the determination is continued until the maximum critical desorption pressure difference between the coalbeds in the combined interval satisfies Formula (1);

the reservoir pressure gradient difference in the optimization indicators of the sweet spot section is determined according to Formula (2):

$$\max|\Delta W_{ij}| < \Delta W_{max} \quad (2)$$

in the formula, $\Delta W_{max}$ is the maximum allowable reservoir pressure gradient difference in the combined interval and can be determined by numerical simulation or field test, and $\Delta W_{ij}$ is the reservoir pressure gradient difference of any two coalbeds in the combined interval, wherein i and j take 1, 2, 3 . . . , and i≠j;

if the maximum reservoir pressure gradient difference between the coalbeds in the combined interval does not satisfy Formula (2), the coalbed with a small reservoir pressure gradient is removed, and the determination is continued until the maximum reservoir pressure gradient difference between the coalbeds in the combined interval satisfies Formula (2).

Compared with the prior art, the present invention has the following advantages and beneficial effects: a systematic and highly targeted selection analysis method for the special geological conditions of the multi-coalbed high ground stress region is formed, which is multi-level progressive and interlocking, and can quickly and effectively optimize suitable areas, and provide a theoretical support for the combinatorial optimization of coalbed methane fracturing and draining and producing after the geological selection.

DESCRIPTION OF EMBODIMENTS

Embodiments of the present invention will be described in detail below with reference to the accompanying drawings, and from the description, an implementer of the present invention can fully understand how the present invention applies the technical means to solve the technical problems, and achieve the technical effect implementation process and implement the present invention according to the foregoing implementation process.

To effectively solve the exploration and development of coalbed methane in multi-coalbed high ground stress regions, the present invention provides a method for analyzing coalbed methane geological selection of a multi-coalbed high ground stress region. The method of the present invention performs optimization of a favorable area, a sweet spot area, and a sweet spot section in sequence, so as to obtain an evaluation result.

The method of the present invention mainly includes the following steps:

The present invention defines the favorable area, the sweet spot area, and the sweet spot section: an area that is beneficial to the development of coalbed methane is called the favorable area, mainly referring to a "favorable syncline", which is optimized in a plurality of coal-bearing synclines, and has a large area and wide range; an area that is beneficial to the high yield of coalbed methane is called the sweet spot area, mainly referring to a "favorable production area", which is optimized in one or more of the optimized favorable areas, and selected in the interior of only one coal-bearing syncline, and has a small area and range; and a vertical combination interval that is beneficial to the development of coalbed methane is called the sweet spot section, which is vertically optimized in the range of the sweet spot area, mainly referring to a "favorable development interval".

The process of the method of the present invention will be described in detail below based on the drawings.

Figure 1:
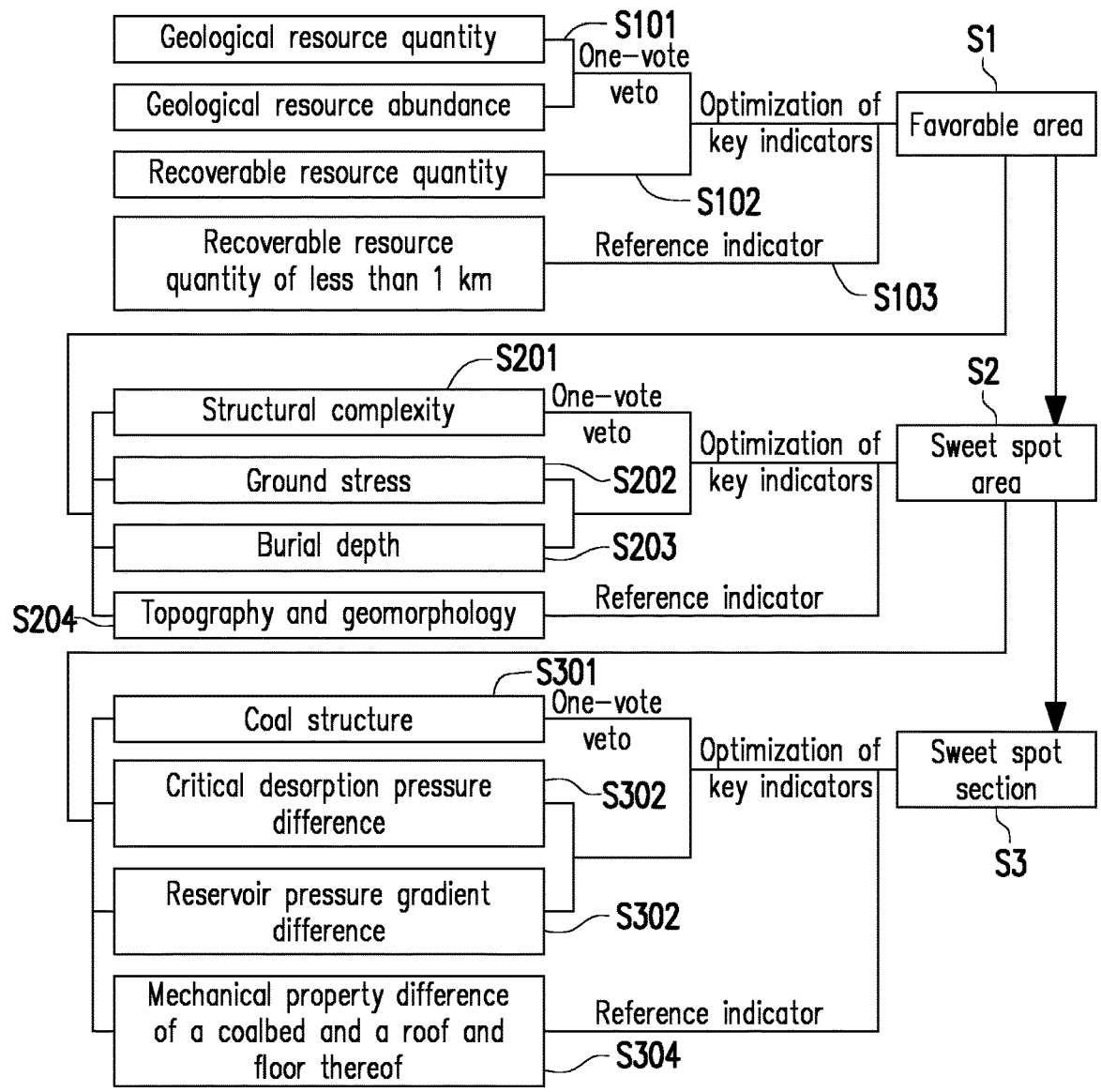
FIG. 1 is a flow chart showing the process of a method of the present invention.

As shown in FIG. 1, in the present invention, the sequence for coalbed methane geological selection is: S1. optimization of a favorable area; S2. optimization of a sweet spot area; and S3. optimization of a sweet spot section.

S1: The selected key indicators are coalbed methane geological resource quantity, coalbed methane geological resource abundance and coalbed methane recoverable resource quantity, and the reference indicator is recoverable resource quantity of less than 1 km.

S2: The selected key indicators are structural complexity, ground stress and burial depth, and the reference indicator is topography and geomorphology.

S3: The selected key indicators are coal structure, a critical desorption pressure difference and a reservoir pressure gradient difference, and the reference indicator is the mechanical property difference of a coalbed and a roof and floor thereof.

As shown in FIG. 1, in the key indicators for optimization of the favorable area provided by the present invention, the coalbed methane geological resource quantity and the coalbed methane geological resource abundance have the one-vote veto rights, and the optimization of the favorable area further includes the following sub-steps.

S101: Optimization of the coalbed methane geological resource quantity and the coalbed methane geological resource abundance: the higher the coalbed methane geological resource quantity and the coalbed methane geological resource abundance, the better; both have the one-vote veto rights, and the one-vote veto criteria are that: the coalbed methane geological resource quantity is less than $30 \times 10^8$ m$^3$ and the coalbed methane geological resource abundance is less than 0.5 m$^3$/km$^2$.

S102: Optimization of the recoverable resource quantity of coalbed methane: the higher the recoverable resource quantity of coalbed methane, the better.

S103: Optimization of the reference indicator of recoverable resource quantity of less than 1 km: the higher the recoverable resource quantity of less than 1 km, the better.

As shown in FIG. 1, in the key indicators for optimization of the sweet spot area provided by the present invention, the structural complexity has the one-vote veto rights, and the optimization of the sweet spot area further includes the following sub-steps.

S201: Optimization of the structural complexity: the simpler the structure, the better; the extremely complex structure is vetoed by one vote; quantitative characterization is performed by the fault fractal dimension; the larger the fault fractal dimension is, the more complicated the structure is; the area with a particularly large fault fractal dimension is vetoed by one vote; and the specific value is determined based on a correspondence of the fault distribution and a contour map of the fault fractal dimension.

S202: Optimization of the ground stress: the higher the ground stress, the worse; a high ground stress area has the maximum horizontal principal stress of greater than 18 MPa; in the case of insufficient ground stress data, the ground stress can be quantitatively characterized by the structural curvature according to the relationship between the structural curvature of the coalbed and the ground stress.

S203: Optimization of the burial depth: the buried depth is optimally within the range of 800 m in a weathering zone, and the deeper, the worse.

S204: Optimization of the reference indicator of topography and geomorphology: the flatter the topography and geomorphology, the better, and it can be quantitatively characterized by the density of the surface contours.

As shown in FIG. 1, in the key indicators for optimization of the sweet spot section provided by the present invention, the coal structure has the one-vote veto rights, and the optimization of the sweet spot section further includes the following sub-steps.

S301: Optimization of the coal structure: the higher the proportion of primary structural coal and granulated coal, the better; and a coalbed is vetoed by one vote when the proportion of granulated coal and mylonitized coal in the coalbed is greater than 60%, and vertical combination is not considered temporarily.

Figure 2:
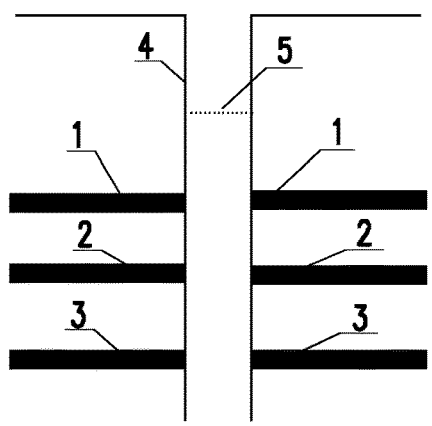
FIG. 2 is a schematic diagram of a combined interval in the optimization process of a sweet spot section.

S302: Optimization of the critical desorption pressure difference: the coalbed is determined layer by layer according to Formula (1):

$$\rho g \Delta h > \max |\Delta P_{cij}| \quad (1)$$

in the formula, $\rho$ is the density of a water column in a wellbore, g is the gravitational acceleration, $\Delta h$ is the height of an initial liquid level in the wellbore from the uppermost coalbed of the combined interval, as shown in FIG. 2, $\Delta P_{cij}$ is the critical desorption pressure difference of any two coalbeds in the combined interval, wherein i and j take 1, 2, and 3, and i≠j.

If the maximum critical desorption pressure difference between the coalbeds in the combined interval does not satisfy Formula (1), the coalbed with a small critical desorption pressure is removed, and the determination is continued until the maximum critical desorption pressure difference between the coalbeds in the combined interval satisfies Formula (1).

S303: Optimization of the coal reservoir pressure gradient difference: the coalbed in the combined interval satisfying Formula (1) in step S302 is determined layer by layer according to Formula (1):

$$\max |\Delta W_{ij}| < \Delta W_{max} \quad (2)$$

in the formula, $\Delta W_{max}$ is the maximum allowable reservoir pressure gradient difference in the combined interval and can be determined by numerical simulation or field test according to the criterion of no inter-layer interference between coalbeds, and $\Delta W_{ij}$ is the reservoir pressure gradient difference of any two coalbeds in the combined interval, wherein i and j take 1, 2, and 3, and i≠j.

If the maximum reservoir pressure gradient difference between the coalbeds in the combined interval does not satisfy Formula (2), the coalbed with a small reservoir pressure gradient is removed, and the determination is continued until the maximum reservoir pressure gradient difference between the coalbeds in the combined interval satisfies Formula (2).

S304: Optimization of the reference indicators: the mechanical properties of the coalbed and the roof and floor mainly affect the extension of the fracturing cracks; when the roof and floor of the coalbed need to be pressed through, the closer the mechanical properties of the coalbed and the roof and floor, the better, and tensile strength of the roof and floor is within 5 times the tensile strength of the coalbed; and when the coalbed and the roof and floor are not required to be pressed through, the greater the difference of the mechanical properties of the coalbed and the roof and floor, the better, and the tensile strength of the roof and floor is 5 times or more the tensile strength of the coalbed.

The forgoing is only preferred embodiments of the present invention, and it should be noted that those skilled in the art can make several modifications and variations, without departing from the technical principle of the present invention. These modifications and variations should be considered within the scope of protection of the present invention.

What is claimed is:

1. A method for analyzing coalbed methane geological selection of a multi-coalbed high ground stress region, wherein optimization is performed on three stages, a favorable area, a sweet spot area, and a sweet spot section in sequence, the method mainly comprising the following steps:

defining an area that is beneficial to the development of coalbed methane as a favorable area, and optimizing in a plurality of coal-bearing synclines; defining an area that is beneficial to achieve the high yield of coalbed methane as a sweet spot area, optimizing in one or more of the optimized favorable areas, and selecting in the interior of only one coal-bearing syncline; and defining a vertical combination interval that is beneficial to the development of coalbed methane as a sweet spot section, and performing vertical optimization in the range of the sweet spot area;

optimization of a favorable area, wherein the selected key indicators are coalbed methane geological resource quantity, coalbed methane geological resource abundance and coalbed methane recoverable resource quantity, and the reference indicator is recoverable resource quantity of less than 1 km;

optimization of a sweet spot area, wherein the selected key indicators are structural complexity, ground stress and burial depth, and the reference indicator is topography and geomorphology; and optimization of a sweet spot section, wherein the selected key indicators are coal structure, a critical desorption pressure difference and a reservoir pressure gradient difference, and the reference indicator is a mechanical property difference of a coalbed and a roof and floor thereof.

2. The method for analyzing coalbed methane geological selection of a multi-coalbed high ground stress region according to claim 1, wherein the structural complexity is quantified by fault fractal dimension, and the ground stress is quantified by structural curvature.

3. The method for analyzing coalbed methane geological selection of a multi-coalbed high ground stress region according to claim 2, wherein the coalbed methane geological resource quantity and the coalbed methane geological resource abundance in the optimization indicators of the favorable area have one-vote veto rights, and the one-vote veto criteria are that the coalbed methane geological resource quantity is less than $30 \times 10^8$ m$^3$ and the coalbed methane geological resource abundance is less than 0.5 m$^3$/km$^2$; the structural complexity in the optimization indicators of the sweet spot area has the one-vote veto rights, the one-vote veto criterion for the structural complexity is a fault-intensive development area, and the specific value is determined according to a correspondence of the fault distribution and a contour map of the fault fractal dimension; the coal structure in the optimization indicators of the sweet spot section has the one-vote veto right, and one-vote veto criterion for the coal structure is that the proportion of granulated coal and mylonitized coal is greater than 60%.

4. The method for analyzing coalbed methane geological selection of a multi-coalbed high ground stress region according to claim 1, wherein in the process of optimization, the key indicators are considered first, and then the reference indicators are considered; a one-vote veto indicator in the key indicators is considered first, and then other key indicators are considered; in the optimization process of the sweet spot area, the priority of the key indicators from high to low in sequence is: the structural complexity, the ground stress and the burial depth; and in the optimization process of the sweet spot section, the priority of the key indicators from high to low in sequence is: the coal structure, the critical desorption pressure difference and the reservoir pressure gradient difference.

5. The method for analyzing coalbed methane geological selection of a multi-coalbed high ground stress region according to claim 4, wherein the critical desorption pressure difference in the optimization indicators of the sweet spot section is determined according to Formula (1):

$$\rho g \Delta h > \max |\Delta P_{cij}| \quad (1)$$

in the formula, $\rho$ is the density of a water column in a wellbore, g is the gravitational acceleration, $\Delta h$ is the height of a level in the wellbore from the uppermost coalbed of the combined interval, and $\Delta P_{cij}$ is the critical desorption pressure difference of any two coalbeds in the combined interval, wherein i and j take 1, 2, 3 . . . , and i≠j;

when the maximum critical desorption pressure difference between the coalbeds in the combined interval does not satisfy Formula (1), the coalbed with a small critical desorption pressure is removed, and the determination is continued until the maximum critical desorption pressure difference between the coalbeds in the combined interval satisfies Formula (1);

the reservoir pressure gradient difference in the optimization indicators of the sweet spot section is determined according to Formula (2):

$$\max |\Delta W_{ij}| < \Delta W_{max} \quad (2)$$

in the formula, $\Delta W_{max}$ is the maximum allowable reservoir pressure gradient difference in the combined interval and can be determined by numerical simulation or field test, and $\Delta W_{ij}$ is the reservoir pressure gradient difference of any two coalbeds in the combined interval, wherein i and j take 1, 2, 3 . . . , and i≠j;

when the maximum reservoir pressure gradient difference between the coalbeds in the combined interval does not satisfy Formula (2), the coalbed with a small reservoir pressure gradient is removed, and the determination is continued until the maximum reservoir pressure gradient difference between the coalbeds in the combined interval satisfies Formula (2).

6. The method for analyzing coalbed methane geological selection of a multi-coalbed high ground stress region according to claim 2, wherein in the process of optimization, the key indicators are considered first, and then the reference indicators are considered; a one-vote veto indicator in the key indicators is considered first, and then other key indicators are considered; in the optimization process of the sweet spot area, the priority of the key indicators from high to low in sequence is: the structural complexity, the ground stress and the burial depth; and in the optimization process of the sweet spot section, the priority of the key indicators from high to low in sequence is: the coal structure, the critical desorption pressure difference and the reservoir pressure gradient difference.

7. The method for analyzing coalbed methane geological selection of a multi-coalbed high ground stress region according to claim 6, wherein the critical desorption pressure difference in the optimization indicators of the sweet spot section is determined according to Formula (1):

$$\rho g \Delta h > \max |\Delta P_{cij}| \quad (1)$$

in the formula, $\rho$ is the density of a water column in a wellbore, g is the gravitational acceleration, $\Delta h$ is the height of a level in the wellbore from the uppermost coalbed of the combined interval, and $\Delta P_{cij}$ is the critical desorption pressure difference of any two coalbeds in the combined interval, wherein i and j take 1, 2, 3 . . . , and i≠j;

when the maximum critical desorption pressure difference between the coalbeds in the combined interval does not satisfy Formula (1), the coalbed with a small critical desorption pressure is removed, and the determination is continued until the maximum critical desorption pressure difference between the coalbeds in the combined interval satisfies Formula (1);

the reservoir pressure gradient difference in the optimization indicators of the sweet spot section is determined according to Formula (2):

$$\max |\Delta W_{ij}| < \Delta W_{max} \quad (2)$$

in the formula, $\Delta W_{max}$ is the maximum allowable reservoir pressure gradient difference in the combined interval and can be determined by numerical simulation or field test, and $\Delta W_{ij}$ is the reservoir pressure gradient difference of any two coalbeds in the combined interval, wherein i and j take 1, 2, 3 . . . , and i≠j;

when the maximum reservoir pressure gradient difference between the coalbeds in the combined interval does not satisfy Formula (2), the coalbed with a small reservoir pressure gradient is removed, and the determination is continued until the maximum reservoir pressure gradient difference between the coalbeds in the combined interval satisfies Formula (2).

8. The method for analyzing coalbed methane geological selection of a multi-coalbed high ground stress region according to claim 3, wherein in the process of optimization, the key indicators are considered first, and then the reference indicators are considered; a one-vote veto indicator in the key indicators is considered first, and then other key indicators are considered; in the optimization process of the sweet spot area, the priority of the key indicators from high to low in sequence is: the structural complexity, the ground stress and the burial depth; and in the optimization process of the sweet spot section, the priority of the key indicators from high to low in sequence is: the coal structure, the critical desorption pressure difference and the reservoir pressure gradient difference.

9. The method for analyzing coalbed methane geological selection of a multi-coalbed high ground stress region according to claim 8, wherein the critical desorption pressure difference in the optimization indicators of the sweet spot section is determined according to Formula (1):

$$\rho g \Delta h > \max |\Delta P_{cij}| \quad (1)$$

in the formula, $\rho$ is the density of a water column in a wellbore, g is the gravitational acceleration, $\Delta h$ is the height of a level in the wellbore from the uppermost coalbed of the combined interval, and $\Delta P_{cij}$ is the critical desorption pressure difference of any two coalbeds in the combined interval, wherein i and j take 1, 2, 3 . . . , and i≠j;

when the maximum critical desorption pressure difference between the coalbeds in the combined interval does not satisfy Formula (1), the coalbed with a small critical desorption pressure is removed, and the determination is continued until the maximum critical desorption pressure difference between the coalbeds in the combined interval satisfies Formula (1);

the reservoir pressure gradient difference in the optimization indicators of the sweet spot section is determined according to Formula (2):

$$\max |\Delta W_{ij}| < \Delta W_{max} \quad (2)$$

in the formula, $\Delta W_{max}$ is the maximum allowable reservoir pressure gradient difference in the combined interval and can be determined by numerical simulation or field test, and $\Delta W_{ij}$ is the reservoir pressure gradient difference of any two coalbeds in the combined interval, wherein i and j take 1, 2, 3 . . . , and i≠j;

when the maximum reservoir pressure gradient difference between the coalbeds in the combined interval does not satisfy Formula (2), the coalbed with a small reservoir pressure gradient is removed, and the determination is continued until the maximum reservoir pressure gradient difference between the coalbeds in the combined interval satisfies Formula (2).

* * * * *